United States Patent
Harlow et al.

(10) Patent No.: US 6,633,632 B1
(45) Date of Patent: Oct. 14, 2003

(54) METHOD AND APPARATUS FOR DETECTING THE NUMBER OF SPEAKERS ON A CALL

(75) Inventors: John Bruce Harlow, Middletown, NJ (US); Robert Sayko, Colts Neck, NJ (US); Bruce D. Wycherley, Wanamassa, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/409,619

(22) Filed: Oct. 1, 1999

(51) Int. Cl.[7] .................................................. H04M 3/00
(52) U.S. Cl. .................... 379/188; 379/191; 379/88.01
(58) Field of Search ........................... 379/32.01, 32.02, 379/32.04, 188, 189, 191, 192, 196, 201.01, 207.02, 114.14, 114.01, 88.01, 88.02, 202.01

(56) References Cited

U.S. PATENT DOCUMENTS

| 5,623,539 | A | * | 4/1997 | Bassenyemukasa et al. 379/189 |
| 6,061,648 | A | * | 5/2000 | Saito ............................ 704/219 |
| 6,363,145 | B1 | * | 3/2002 | Shaffer et al. ......... 379/265.02 |
| 6,442,265 | B1 | * | 8/2002 | Harlow et al. .............. 379/189 |

\* cited by examiner

Primary Examiner—Fan Tsang
Assistant Examiner—Ovidio Escalante

(57) ABSTRACT

An apparatus and method for detecting the number of speakers participating in a call having a speaker counting device that is connected with a network for monitoring calls placed over the network. The speaker counting device samples a call to determine the number of speakers participating in the call. Therefore, the speaker counting device allows the network service provider to automatically determine how many different speakers have participated in a particular call over a period of time.

3 Claims, 4 Drawing Sheets

FIG. 3

| NUMBER | ORIGINATING TERMINAL ID | DESTINATION TERMINAL ID | VOICE RECORD | TIME FIRST SPOKE | TIME LAST SPOKE | % OF CALL | FLAG |
|---|---|---|---|---|---|---|---|
| 18 | 102 | 108 | VOICE 1 | 0min 1sec | 27min 32sec | 45 | 0 |
|  |  |  | VOICE 2 | 0min 27sec | 19min 7sec | 40 |  |
|  |  |  | VOICE 3 | 23min 0sec | 28min 15sec | 15 |  |
| 19 | 23 | 76 | VOICE 1 | 0min 20sec | 20min 37sec | 14 | 1 |
|  |  |  | VOICE 2 | 0min 21sec | 21min 5sec | 16 |  |
|  |  |  | VOICE 3 | 120min 30sec | 180min 15sec | 32 |  |
|  |  |  | VOICE 4 | 120min 45sec | 181min 43sec | 38 |  |
|  |  |  | VOICE 5 | 240min 0sec | 240min 9sec | 1 |  |
| 20 | 193 | 4 | VOICE 1 | 0min 3sec | 17min 51sec | 52 | 0 |
|  |  |  | VOICE 2 | 0min 27sec | 18min 3sec | 48 |  |
| ... |  |  |  |  |  |  |  |

METHOD AND APPARATUS FOR DETECTING THE NUMBER OF SPEAKERS ON A CALL

BACKGROUND OF THE INVENTION

1. Field of Invention

This invention relates to a method and apparatus for determining the number of speakers on a call.

2. Description of Related Art

Currently, unscrupulous individuals use a variety of techniques to defraud network service providers. For example, one technique is for an individual to fraudulently set up a telephone call with no intention of paying for it and to leave the call up for extended periods of time which may exceed many hours or several days. The fraudster typically places the long distance call from, say, New York City to Hong Kong by charging the call to a stolen calling card number. Co-conspirators in the fraud, which are located in each city, work with the local population to "sell" time on the call. The call is then left up for a very long time while the locals take turns using the connection to speak to acquaintances in the distant city. Accordingly, there is a need for new processes and technology to detect and prevent such frauds from occurring.

SUMMARY OF THE INVENTION

The present invention provides a speaker counting device that is coupled to a network for monitoring calls placed over the network. The speaker counting device samples a call to determine the number of speakers participating in the call. Therefore, the speaker counting device allows the network service provider to automatically determine how many different speakers have participated in a call over some period of time.

It has been recognized that as the number of speakers which participate in a call increases, the probability that the call is a fraudulent one also increases. This is especially true if the same speakers do not consistently "reappear" in the voice traffic over the duration of the call.

The present invention determines the number of speakers on a telephone call by using automatic speech processing techniques, such as voice identification and voice verification. Such techniques are not required to depend on the language being spoken or the content of the speech. For example, the speaker counting device can sample speech and attribute that sample to a first voice record (Voice 1). Later, the speaker counting device can again sample the call and test whether a detected voice is the same as Voice 1. If the voice sample does not match a previously identified voice (e.g., Voice 1), then the speaker counting device would attribute the sampled voice segment to a second voice record, Voice 2. Again, the speaker counting device may sample a portion of the call and test whether Voice 2 is still speaking. If the voice sample does not match the previously identified voice record of Voice 2, then the speaker counting device would then test whether the voice sample matches the previously identified voice record of Voice 1. If the voice sample does not match Voice 1, then the voice sample would be assigned to the next available voice record, Voice 3. The speaker counting device would then repeat this process for as many speech samples as are taken during the call, and thereby count the number of different speakers participating in the call.

The more speech samples the speaker counting device uses, the more accurate the speaker counting device is in determining the number of speakers. The frequency of sampling and the length of the samples can be controlled in a variety of ways. In addition to fixed frequency or length, they could be random or controlled in more complex ways. For example, they can be database driven or dynamically controlled by a program according to the confidence level in identifying the speaker based on earlier speech samples. Furthermore, the sampling rate and/or length of the samples can be varied based on a growing suspicion of fraud. Additionally, as each voice sample is attributed to an existing voice record, the speaker counting device updates the corresponding voice data characteristics in a memory, thus making future voice identification more accurate.

Additionally, the speaker counting device can also determine long periods of silence which are another predictor of whether a call is fraudulent.

BRIEF DESCRIPTION OF THE DRAWINGS

The invention is described in detail with reference to the following figures, wherein like numerals reference like elements, and wherein:

FIG. 3 is an exemplary diagram of a data structure of the speaker counting device memory.

DETAILED DESCRIPTION OF PREFERRED EMBODIMENTS

Figure 1:
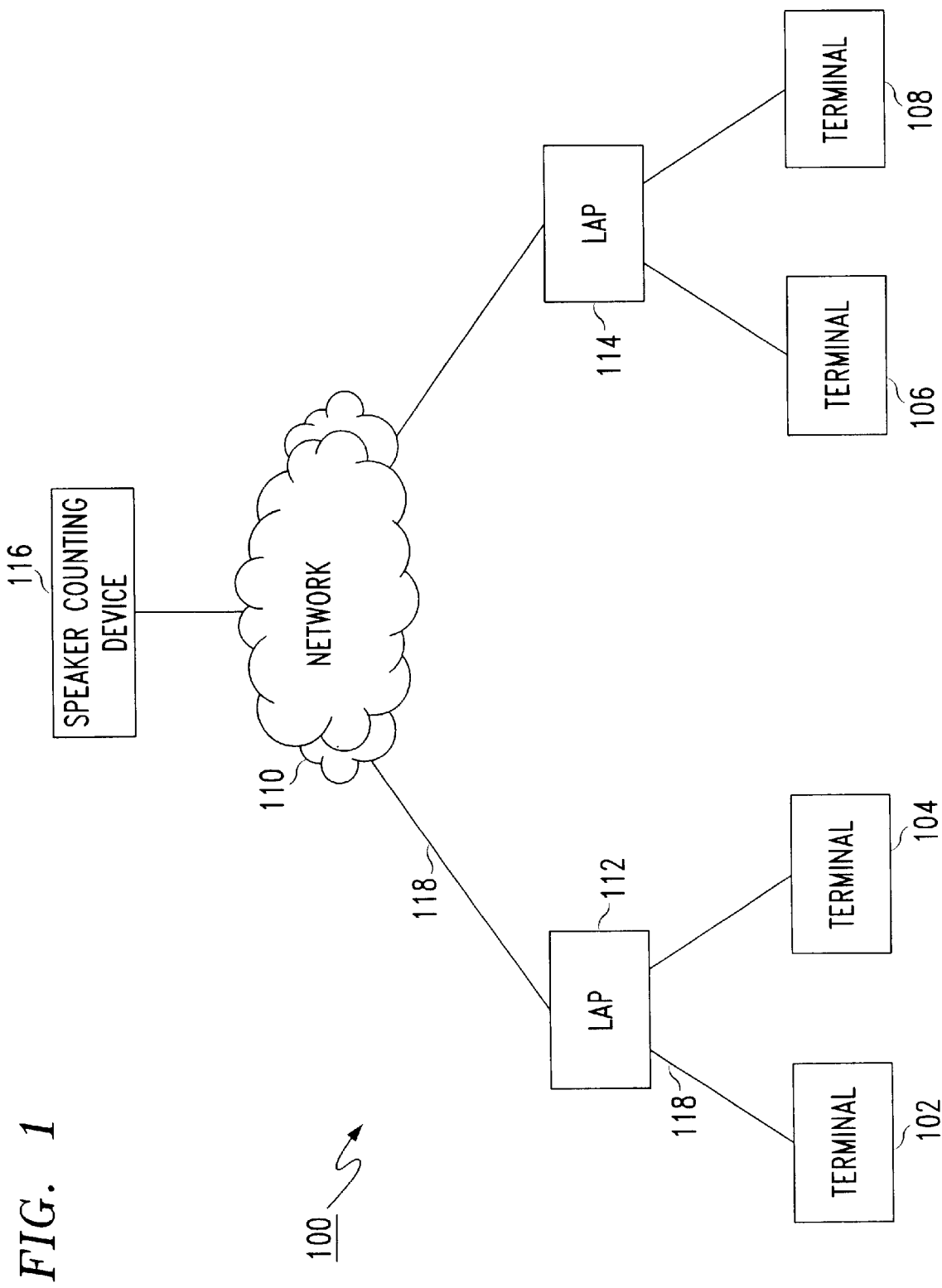
FIG. 1 is an exemplary block diagram of a system according to the present invention.

FIG. 1 is an exemplary block diagram of a communications system 100. The system 100 includes a plurality of terminals 102–108 in communication with a network 110 through Local Access Providers (LAPs) 112, 114. The LAPs 112, 114 may employ any device and/or technique that provides an interface to the network 110, such as company intranet servers, Internet Access Providers (IAPs), satellite base stations, cellular communications base stations, and the like, in addition to the traditional local phone company switching centers.

The communications system 100 further includes a speaker counting device 116 connected with the network 110. The speaker counting device 116 may perform network monitoring and counting functions of the calls placed over the network 110. While the speaker counting device 116 is shown as an independent unit coupled to the network 110, it can also be incorporated in the terminals 102–108, in the LAPs 112, 114 or may be distributed throughout the network 110. Any configuration that permits monitoring of the network 110 in order to determine the number of speakers on a particular call placed over the network can be used without departing from the spirit and scope of the present invention.

Terminals 102–108 can be devices of any type that allow for the transmission and/or reception of communication signals. For example, terminals 102–108 can be land-line telephones, cellular telephones, computers, personal digital assistants, video telephones, video conference apparatuses, smart or computer-assisted televisions, Web TV™ and the like for transmitting voice. For purposes of the following description of the present invention, it will be assumed that terminals 102–108 are telephones.

The terminals 102–108 are in communication with network 110 over communication links 118. These communication links 118 may be any type of connection that allows the transmission of information. Some examples include conventional telephone lines, fiberoptic lines, direct serial\parallel connections, cellular telephone connections, satellite communication links, local area networks (LANs), intranets and the like.

The network 110 may be a single network or a plurality of networks of the same or different types. For example, the network 110 may include a local telephone network (such as a Bell Atlantic telephone network) in connection with a long-distance network such as an AT&T long-distance telephone network. The network 110 may be a data network or a telecommunications network in connection with a data network. Furthermore, network 110 may be a circuit switched network or an Internet Protocol (IP) network, wherein packet telephony services are available. Any combination of telecommunications and type of data network may be used without departing from the spirit and scope of the present invention. For the purposes of discussion, it will be assumed that the network 110 is a single telecommunications network. However, it is to be understood that the speaker counting device 116 can be applied to numerous situations such as IP telephony, conference calls, cellular phone calls, radio communications, or the like.

Figure 2:
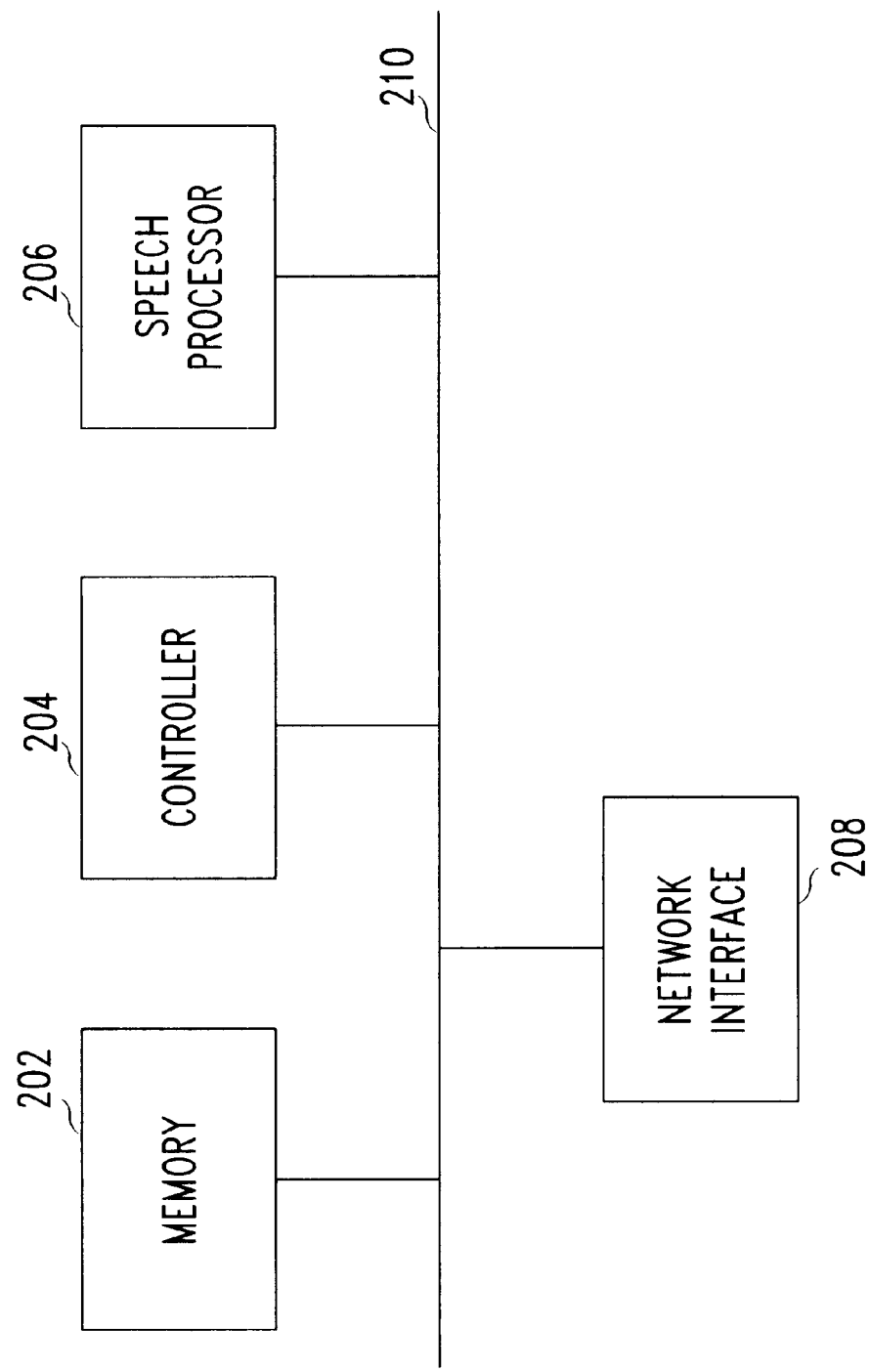
FIG. 2 is an exemplary block diagram of the speaker counting device of FIG. 1 according to the invention.

FIG. 2 is a block diagram of the speaker counting device 116. The speaker counting device can include a memory 202, a controller 204, a speech processor 206 and a network interface 208. The above components are coupled together via a control/data bus 210. The above architecture is exemplary only. Other architectures of the components and/or fewer or more components may be used without departing from the spirit and scope of the present invention.

The network interface 208 is coupled to the network 110 and can monitor calls placed between terminals 102–108. When a call is placed from a calling terminal 102 to a called terminal 108 over the network 110, the controller 204 can begin to monitor the call via the network interface 208. Once the monitoring of a call has begun, the controller 204 instructs the speech processor 206 to begin to count the number of distinct speakers (i.e., distinct sound sources) participating in the call by sampling portions of the call in order to identify different speakers. Each speaker is characterized by its own set of acoustical properties that differentiate a sound source from other sound sources. The speech processor 206 determines the number of speakers on a call by using a combination of automatic speech processing techniques, such as voice identification and voice verification.

Voice identification is used to identify a speaker (sound source) based on the speaker's unique set of acoustical properties. It is important to note that voice identification identifies the sound source and does not necessarily determine the identity of the speaker or what is being said. However, voice identification can be used to both identify the speaker and the content of the speech if this system requirement is desired. Based on a sampled portion of the call, voice identification algorithms can define the sampled portion using a set of sound parameters that are used to characterize all sounds. The sound parameters for the sampled sounds can be subsequently stored in the memory 202 of the speaker counting device 116 as voice records. Voice records can include the sampled sound, parameters derived from the sampled sound, or a combination thereof.

Voice verification algorithms are capable of comparing various voice records to determine whether the corresponding sound samples were created by the same sources (i.e., speakers). The speech processor 206 uses voice verification to compare the voice records stored in memory 202 with a voice record corresponding to a current sound sample to determine whether the sound sample was created by a previously identified speaker or a new speaker. Once a new speaker is identified from a sampled sound of a call, the corresponding voice record is then stored in memory 202.

Voice identification and voice verification use very similar technologies and algorithms, and are collectively known as "speaker recognition". Speaker recognition methods may be text-dependent or text-independent, the former requiring the speaker to say keywords or sentences having the same text for both training and recognition trials, and the latter not relying on a specific text being spoken. For example, one textdependent speaker recognition technique is provided by the existing AT&T Network Watson 1.0 software, and an example of a text-independent speaker recognition technique, which is applicable for this invention, is provided by SRI International.

FIG. 3 shows an exemplary data structure 300 of memory 202. Field 302 holds an identification number of a particular call. For example, data structure 300 is currently storing information pertaining to calls 18–20.

Fields 304 and 306 store the terminal IDs of calling and called terminals, respectively. For example, in the first row a terminal having terminal ID 102 has placed a call to a terminal having terminal ID 108. The call is now being monitored by the speaker counting device 116 as call identification number 18.

Field 308 stores the voice records of separate sound sources (speakers) that have been identified by the speech processor 206, as described above. For example, call identification number 18 includes voice records for three separate speakers which have been determined to be participants in the call: Voice 1, Voice 2 and Voice 3. Each of the voice records in field 308 contain a set of sound parameters and/or sampled sound which uniquely define a speaker. During the call, the number of voice records may be increased as the detected number of speakers participating in the call increases.

Field 310 stores the time that a speaker has first spoken relative to the beginning of the call. For example, Voice I of call identification number 18 first spoke at 1 second into the call, whereas the speaker corresponding to Voice 2 first spoke at 27 seconds into the call. The speaker corresponding to Voice 3 did not begin speaking until 23 minutes after the call began.

Field 312 contains a time that a corresponding speaker last spoke during the call. This time is also measured relative to the beginning of the call. For example, in call identification number 18, Voice 1 last spoke at 27 minutes and 32 seconds into the call.

Field 314 contains the percentage of the phone call which a particular speaker has spoken. For example, in call identification number 18, Voice 1 has spoken for 45% of the call, while Voice 2 has spoken for only 40% of the call and Voice 3 has spoken for only 15% of the call.

It is to be understood that fields 310–314 contain statistical data which is readily calculated from data available over the network 110. Furthermore, fields 310–314 are shown as examples of the type of data that may be helpful to compile in order to determine whether network fraud is occurring. Fields can be added or deleted from the data structure 300 without departing from the spirit and scope of the present invention.

Field 316 contains the flag which can be set by the speaker counting device 116 to indicate that a call may be fraudulent.

The criteria for determining fraudulence, i.e., whether the flag of Field 316 should be set, can come from a variety of sources, such as a fraud control database, or algorithmically from a fraud detecting program. A "0" in this column indicates that a call does not yet contain any suspicious activity which would warrant a closer look. In contrast, a "1" indicates that suspicious activity has taken place during this call and that the call should be closely inspected to determine whether fraudulent use of the network 110 has occurred. For example, the flag may be changed from a "0" to a "1" because the number of voices participating in the call has exceeded a predetermined number or a long period of silence has occurred. By way of example, call identification number 18 has a "0" flag while call identification number 19 contains a "1" flag. Therefore, call identification number 19 should be more closely inspected in the future.

Figure 4:
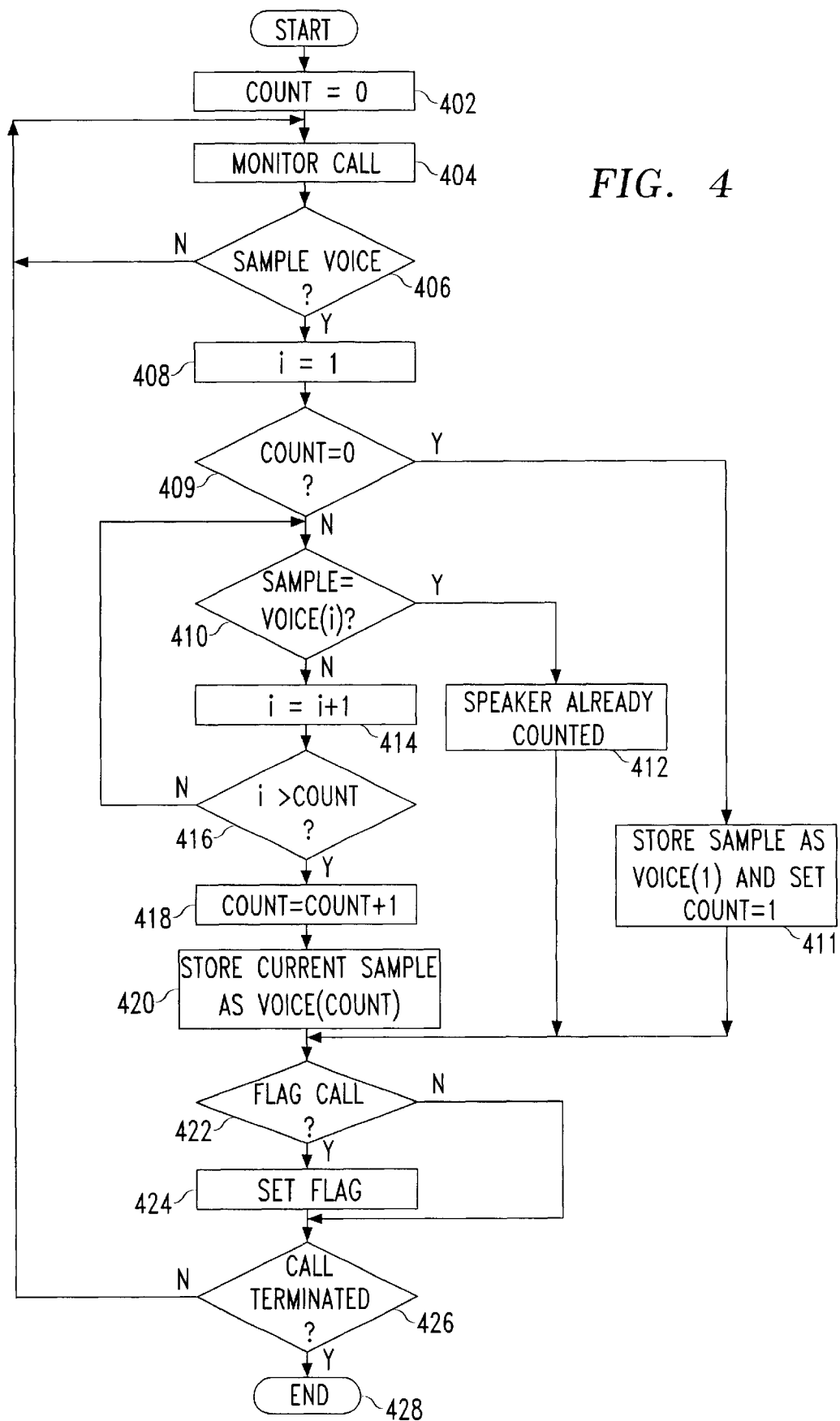
FIG. 4 is a flow chart outlining an exemplary operation of the speaker counting device according to the invention.

FIG. 4 is a flow chart outlining one exemplary process of the invention. In step 402, a count variable is reset to 0. The count variable is used to maintain a count of the number of speakers participating in a single call that is being monitored.

In step 404, the call is monitored (continuously, periodically, or randomly) to determine whether voice communication is taking place. In step 406 a sample of the voice communication is taken. If the voice communication is sufficient enough to create a voice record, the process proceeds to step 408; otherwise, the process returns to step 404 where the call is again monitored for a voice.

In step 408 the variable i is set equal to 1. The variable i is used by the process to step through the array of voice records (i.e., Voice (1), Voice (2) . . . Voice (i)).

In step 409, the process checks to see if the Count is equal to 0. If the Count variable is equal to 0, the process proceeds to step 411; otherwise the process proceeds to step 410. In step 411, since the Count variable is currently "0", the process recognizes that the sample voice record is the first speaker of the call. Accordingly, in step 411 the process stores the voice record of the sampled voice as Voice (1) and sets the count variable to "1". The process then goes to step 422.

In step 410, the process checks to see if the sound sample is attributable to the Voice (i). If so, the process then recognizes that the speaker has already been counted in step 412 and proceeds to step 422. In other words, if the voice record of the sample is equivalent to the voice record Voice (i) and a match exists, then the speaker is the one that has already been identified and counted. If, however, the voice record of the sample is not equal to the voice record Voice (i), then the i variable is incremented by 1 in step 414 and the process proceeds to step 416.

In step 416, the process checks to see whether the variable i is greater than the Count variable. If variable i is not greater than the Count variable, then more voice records exist which need to be compared with the voice records of the current sample and the process returns to step 410 where the procedure is repeated with the next stored voice record; otherwise, the process proceeds to step 418.

In step 418 the count variable is incremented by 1. In step 420, the voice record of the current sample is stored as Voice (Count) which corresponds to the next available voice record.

In step 422, the process determines whether the call is one that has a high probability of being a fraudulent call. If the call is determined to be fraudulent, then the process proceeds to step 424 where a fraud flag is set for the call; otherwise, the process proceeds to step 426.

In step 426, the system checks to see whether the call has been terminated. If yes, the process proceeds to step 428 where the process ends; otherwise, the process returns to step 404 where the process is repeated.

By way of example, assume that a call was placed under false pretenses over network 110 from the calling terminal 102 in Hong Kong to the called terminal 108 in New York by use of a stolen credit card. Furthermore, assume that both the calling and called parties have organized groups of individuals on each end of the call who are willing to pay for use of the connection to talk with an acquaintance on an opposite end of the call.

Once the call is placed, the speaker counting device begins to monitor the call to count the numbers of speakers participating in the call. As a first set of speakers begins to speak, the speech processor 206 under the instruction of controller 204 takes samples of the voices, identifies the voices and stores the samples in corresponding voice records, such as Voice 1 and Voice 2, respectively.

The speakers corresponding to voice records Voice 1 and Voice 2 continue to speak for the next 20 minutes. During the conversation the speech processor continues to sample both of the voices while continuing to recognize that speaker 1 and speaker 2 remain talking in the conversation. Voice samples taken during this period can be used to refine the existing voice records to more accurately define the speaker's voice.

When the conversation between speaker 1 and speaker 2 ends, there is a long segment of silence as the next two speakers are informed that they may now communicate over the call connection. The large segment of silence is noted by the speech processor 206 and stored in the memory 202.

Once the next two speakers begin to communicate, the speech processor 206 immediately identifies speakers 3 and 4 as being different speakers from the previous speakers 1 and 2. Accordingly, the speech processor 206, under the instructions of controller 204 creates corresponding voice records for speakers 3 and 4 (i.e., Voice 3 and Voice 4) and stores them in memory 202.

After 40 minutes of conversation, speakers 3 and 4 decide to end their call. However, speaker 4 remains on the line until a new speaker, speaker 5, begins another communication with speaker 4. Immediately, the speech processor 206 recognizes speaker 5 as a new speaker, and stores a voice record of speaker 5 in memory 202.

In a similar manner the process may continue until the call is terminated. Additionally, at any point during the call which the speaker counting device 116 determines a high probability that the call is a fraudulent one, the call may be terminated, or the proper authorities notified in order to apprehend the fraudulent calling parties on either end of the call.

While the invention has been described in terms of traditional circuit-based telephony, it can also be applied to other technologies such as IP telephony, cellular phone calls, and all types of radio communications. The invention can support new telecommunication services such as, for example, services in which charges are based on the number of participants (such as teleconferencing or chat rooms), services in which the number of participants is restricted, and services in which the features are modified based on the number of participants (for example, more bandwidth for more people on a conference call). Additionally, the invention could support telephone surveys, opinion polling, and voting by helping to prevent multiple counting of the same person.

The invention can be used outside the context of telephony in any acoustical counting or monitoring system. For example, the invention can count the number of participants in a meeting. The invention can help to monitor and encourage participation in distance learning classes.

The invention can be used to count the number of animal species in a location and the number of individuals in a species. Applications include conservation (counting the number of endangered species in a rain forest) and agriculture (counting the number of insect pests in a field).

The invention can also be used in troubleshooting mechanical systems where each part of a device may have its own acoustical signature. Thereby, a change in that particular acoustical signature can indicate mechanical failure.

As shown in FIG. 2, the method of this invention is preferably implemented on a programmed processor. However, the speaker counting device 116 can also be implemented as part of a switch or a stand alone on a general purpose or a special purpose computer, a programmed microprocessor or microcontroller and peripheral integrated circuit elements, an Application Specific Integrated Circuit (ASIC), or other integrated, hardware electronic or logic circuit such as a discrete element circuit, a programmable logic device such as a PLD, PLA, FPGA, or PAL, or the like. In general, any device on which exists a finite state machine capable of implementing the flowchart shown in FIG. 4 can be used to implement the speaker counting device 116 functions of this invention.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An apparatus for detecting the number of speakers participating in a call, comprising:

a network interface;

a speech processor; and a controller coupled with the network interface, the controller monitoring the call in order to gather sample sound information, determining voice characteristic information from the sampled sound information, determining the number of voices engaging in the call based on the voice characteristic information and determining the call to be a fraudulent call based on a number of different voices participating in the call and on a length of periods of silence during the call.

2. A method for detecting the number of speakers participating in a call, comprising:

monitoring the call and sampling sounds;

comparing the sampled sound with a previously sampled sound to determine whether the sampled and previously sampled sound originated from a same sound source; and determining the call to be a fraudulent call based on a number of different voices participating in the call and on a length of periods of silence during the call.

3. A method for detecting the number of speakers participating in a call, comprising:

monitoring the call and gathering sample sound information;

determining voice characteristic information from the sampled sound information;

determining the number of voices engaging in the call based on the voice characteristic information; and determining the call to be fraudulent call based on a number of different voices participating in the call and on a length of periods of silence during the call.

* * * * *